United States Patent [19]
Tobin

[11] 3,800,557

[45] Apr. 2, 1974

[54] UNIVERSAL JOINT WITH FLEXIBLY CONNECTED OFFSET CROSS PINS

[75] Inventor: Michael F. Tobin, Saginaw, Mich.

[73] Assignee: General Motors Corporation, Detroit, Mich.

[22] Filed: Sept. 5, 1972

[21] Appl. No.: 286,309

[52] U.S. Cl. .................................. 64/13, 64/17 SP
[51] Int. Cl. ............................................. F16d 3/78
[58] Field of Search .................. 64/13, 17 SP, 17 R

[56] References Cited
UNITED STATES PATENTS
| | | | |
|---|---|---|---|
| 3,427,827 | 2/1969 | Airheart | 64/27 R |
| 3,062,025 | 11/1962 | Bastow et al. | 64/13 |
| 2,499,030 | 2/1950 | Moon | 64/17 SP |
| 3,212,290 | 10/1965 | Walden | 64/17 SP |
| 2,319,027 | 5/1943 | Aker | 64/13 |
| 2,753,848 | 7/1956 | Burton | 64/13 |
| 3,360,963 | 1/1968 | Turonen | 64/13 |
| 3,543,538 | 12/1970 | Farrell et al. | 64/13 |

Primary Examiner—Benjamin W. Wyche
Assistant Examiner—Randall Heald
Attorney, Agent, or Firm—F. J. Fodale

[57] ABSTRACT

An offset cross pin universal joint has a flexible coupling connecting the cross pins which permits lateral shifting of the cross pin axis during joint rotation.

2 Claims, 4 Drawing Figures

UNIVERSAL JOINT WITH FLEXIBLY CONNECTED OFFSET CROSS PINS

This invention relates generally to cross pin universal joints and more specifically to cross pin universal joints in which the cross pins are offset axially from each other.

In the offset cross pin universal joints known in the prior art, a solid, inelastic member or assembly is used as a driving connection between the offset cross pins which provide the respective pivots for the input and output shafts. Thus the distance between the cross pins is fixed with the result that either the input or the output shaft must be free to translate along its axis and to orbit at the end connected to one of the cross pins as the universal joint is rotated. This complex motion imposed on, for instance the input shaft, requires that the driving connection at the opposite end of the input shaft incorporate some means allowing limited universal movement of the input shaft and that a slip joint be incorporated into such means or the input shaft itself.

The object of this invention is to provide a cross pin universal joint in which the distance between the cross pins is variable during operation thereby reducing the complexity of the motion imposed on the shafts as the joint is rotated.

Another object of this invention is to provide an offset cross pin universal joint in which neither the input nor the output shaft is required to translate.

Yet another object of this invention is to provide an offset cross pin universal joint which does not require a slip joint for either the input or the output shaft.

Still another object of this invention is to provide an offset cross pin universal joint which reduces the sound transmission between the input and the output shafts.

The above objects are generally accomplished by connecting the cross pins with a flexible coupling. The resulting cross pin universal joint is operable at higher angles than those possible with the flexible coupling alone and the manner of operation is quieter and does not require either the input or the output shaft to translate along its axis.

Other objects and features of the invention will become apparent to those skilled in the art as the disclosure is made in the following detailed description of preferred embodiments of the invention as illustrated in the accompanying sheet of drawings in which.

Figure 1:
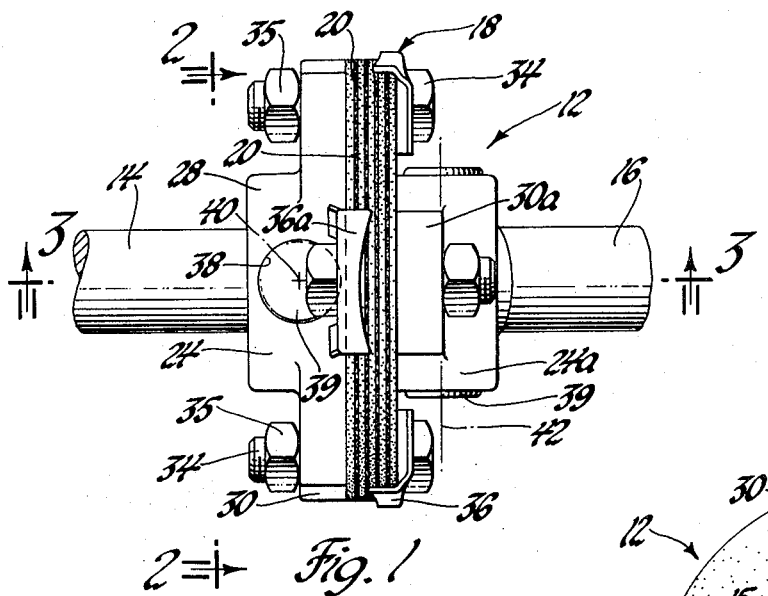
FIG. 1 is an elevation view of an offset cross pin universal joint in accordance with this invention.
Figure 3:
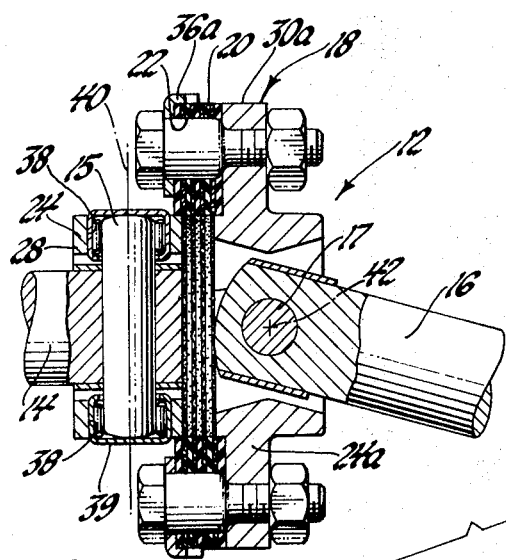
FIG. 3 is a view taken substantially along line 3—3 of FIG. 1.
Figure 2:
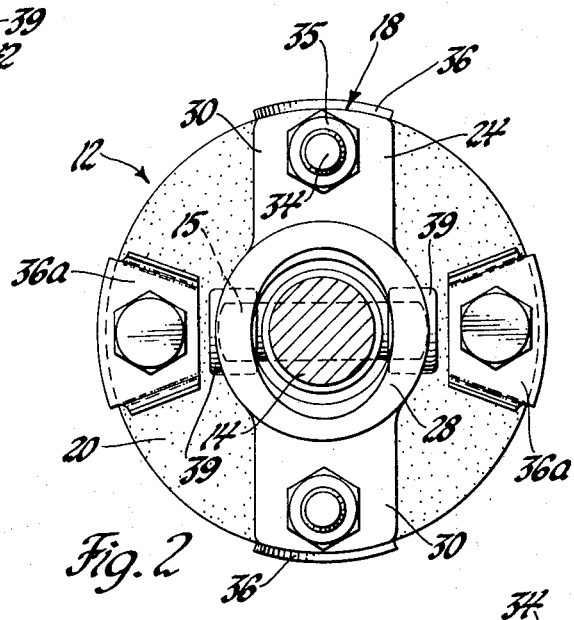
FIG. 2 is a view taken substantially along line 2—2 of FIG. 1.
Figure 4:
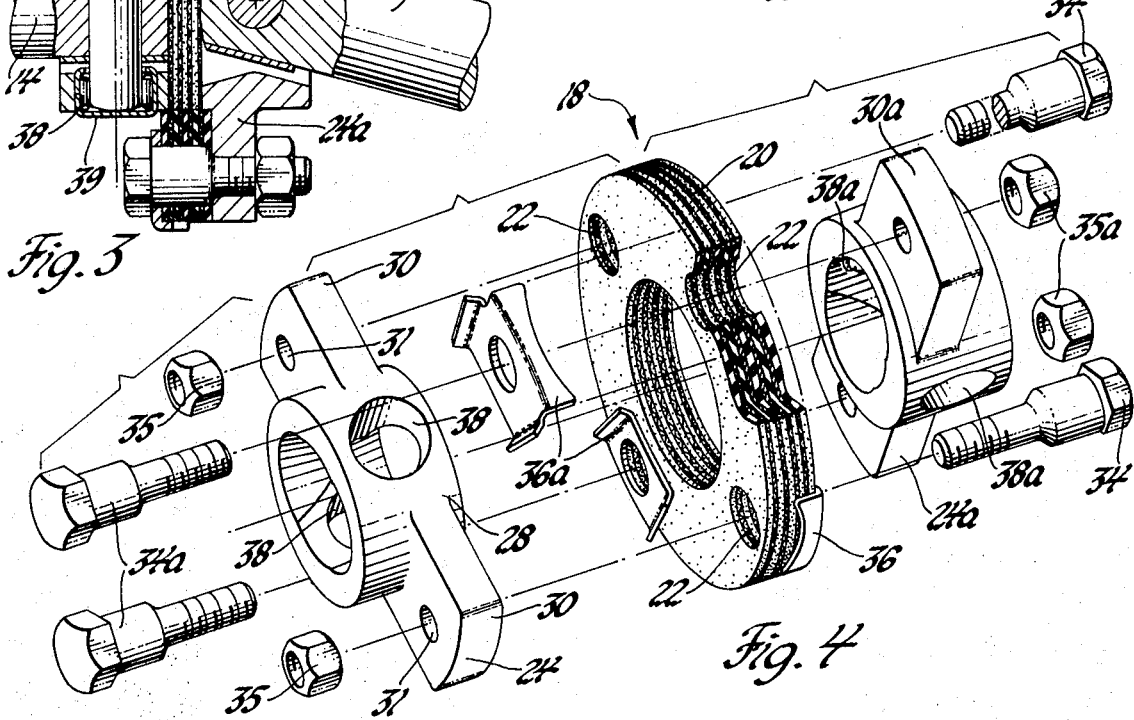
FIG. 4 is an exploded perspective view showing the various parts comprising the flexible coupling incorporated into the offset cross pin universal joint shown in FIG. 1.

Referring now to the drawings, an offset cross pin universal joint in accordance with this invention is indicated generally at 12. The joint 12 comprises an input shaft 14 and an output shaft 16 which carry cross pins 15 and 17 respectively. The cross pins 15 and 17 pivot on an assembly 18 about spaced, mutually perpendicular axes established by the assembly 18.

The assembly 18 includes a laterally flexible, torsionally rigid disc-like member which in the particular construction disclosed is an annulus 20 comprising alternate rubber and fabric layers bonded into a laminate. Four equally, circumferentially spaced holes 22 are provided in the annulus 20 for the independent securement of two identical flanges 24 and 24a. The typical flange 24 comprises a hub 28 with two radial ears 30. The ears 30 abut one face of the annulus 20 and have bolt holes 31 which align with one diametrical pair of the four holes 22 in the annulus 20 and receive bolts 34 inserted into the pair of holes from the opposite side of the annulus 20. The flange 24 is secured to the annulus 20 by the clamping action produced by tightening down the nuts 35 against the ears 30. Preferably, suitably apertured sheet metal reinforcements 36 are provided between the heads of the bolts 34 and the softer annulus 20. The flange piece 24a is independently secured in the same manner through use of the remaining two holes in the annulus 20.

The two flanges 24 and 24a independently secured to the annulus 20 form a flexible coupling which allows small misalignment between the flanges and/or small axial displacements of the flanges with respect to each other by the flexing action of the portions of the annulus 20 located between areas clamped between the radial ears 30 and 30a and the reinforcements 36 and 36a respectively. The annulus 20 also isolates the flange 24 and all of the metal parts associated with it from the flange 24a and all of the metal parts associated with it so that the transmission of noise through the joint 12 is reduced.

Refocussing on the flange 24 of the assembly 18, it is seen that the hub 28 has a pair of coaxial radial bores 38 disposed in a perpendicular relationship to the ears 30. The bores 38 provide seats for bearings 39 in which are journaled the ends of the cross pin 15 carried by the input shaft 14. Thus the flange 24 pivots on the input shaft 14 about the axis 40 of the cross pin 15. Correspondingly, the flange 24a has a pair of coaxial radial bores 38a disposed in a perpendicular relationship to its ears 30a used to pivot the flange 24a on the axis 42 of the cross pin 17 carried by the output shaft 16. The manner in which the flanges 24 and 24a are mounted on the annulus 20 locates the axis 40 of the cross pin 15 and the axis 42 of the cross pin 17 in a laterally spaced perpendicular relationship. However, due to the lateral flexibility of the annulus 20, the axes 15 and 17 can shift with respect to each other.

In operation as the universal joint 12 is rotated with the longitudinal axes of the shafts 14 and 16 angularly related, the assembly 18 turns with a wobbling motion as it is simultaneously pivoting about one or both of the axes 40 and 42. Because the axes 40 and 42 are offset, the cross pin end of either the shaft 14 or the shaft 16 orbits in circular path tangent to the axis of the other shaft at twice the speed at which the joint 12 is rotating. Due to the lateral flexibility of the annulus 20, the distance between the axes 40 and 42 can change during rotation of the joint so that the periodic endwise motion normally associated with the orbiting shaft can be accommodated. Thus neither of the shafts 14 or 16 are required to translate and no slip joint is necessary. It is merely necessary to provide a connection at the remote end of one of the shafts which accommodates a slight universal movement to let the pin end of that shaft orbit. In such an installation, the annulus 20 flexes back and forth laterally as the joint is rotated with the axes of the shafts angularly related.

Thus a universal joint constructed in accordance with this invention enjoys the advantages of both a flexible coupling and a cross pin universal joint and avoids some of the disadvantages of each. For instance, a universal joint in accordance with this invention operated with both the input and output shafts fixed against axial translation, thus avoiding the disadvantage of heretofore offset cross pin universal joints which required a slip coupling for one of the shafts. Moreover the joint operated at a joint angle of approximately (12°) which is almost double that possible with the flexible coupling alone and the sound transmission through the joint was minimal because of the sound absorbing qualities of a laterally flexible annulus which isolated the metallic input and output parts of the universal joint.

I wish it to be understood that I do not desire to be limited to the exact details of construction shown and described, for obvious modifications will occur to a person skilled in the art.

I claim:

1. A universal joint comprising
an input shaft having a longitudinal axis,
an input flange pivoted on said input shaft about a first axis intersecting and perpendicular to the longitudinal axis of said input shaft,
an output shaft having a longitudinal axis,
an output flange pivoted on said output shaft about a second axis intersecting and perpendicular to the longitudinal axis of said output shaft, and
a laterally flexible disc-like member interconnecting said input and output flanges with said first and second axes disposed in a laterally spaced and substantially perpendicular relationship, said input and output shafts being independently connected to said laterally flexible disc-like member at mutually exclusive, circumferentially spaced locations on said laterally flexible disc-like member whereby said axes are laterally shiftable with respect to each other.

2. A universal joint comprising
an input shaft having a longitudinal axis,
a first cross pin carried by said input shaft with its end portions protruding from said input shaft,
an input flange having a hub pivoted on the end portions of said first cross pin, said input flange having diametrically opposed ears in a perpendicular relationship to said first cross pin,
an output shaft having a longitudinal axis,
a second cross pin carried by said output shaft with its end portions protruding from said output shaft,
an output flange having a hub pivoted on the end portions of said second cross pin, said output flange having diametrically opposed ears in a perpendicular relationship to said second cross pin,
a laterally flexible annulus of sound absorbing material,
means clamping said ears on said input flange on said annulus, and
further means clamping said ears on said output flange to said annulus in a perpendicular relationship to said ears on said input flange whereby said input and output shafts are drivingly interconnected in a manner which allows the lateral shifting of said cross pins with respect to each other as said joint rotates with the longitudinal axes of said input and output shafts angularly disposed.

* * * * *